United States Patent Office 3,574,776
Patented Apr. 13, 1971

3,574,776
GASEOUS PHASE PROCESS FOR FLUORINATION OF ALIPHATIC CHLOROHYDROCARBONS
Julius Fülöp, Weiher, Bruchsal, Germany, assignor to Wasagchemie G.m.b.H., Munich, Germany
No Drawing. Filed Mar. 22, 1968, Ser. No. 715,192
Claims priority, application Germany, Apr. 8, 1967, W 43,725
Int. Cl. C07c 17/20, 19/08, 21/18
U.S. Cl. 260—653.3
7 Claims

ABSTRACT OF THE DISCLOSURE

A process for the fluorination of aliphatic chlorinated hydrocarbons which comprises the steps of reacting a gaseous phase of an aliphatic chlorinated hydrocarbon having from 1 to 6 carbon atoms under atmospheric pressure with an alkali metal fluoro-silicate at a temperature between about 250° C. and 400° C. in the presence of from about 1% to 5% by weight, based on said sodium fluoro-silicate, of a catalyst selected from the group consisting of iron oxide, iron oxide hydrates, aluminum oxides, aluminum oxide hydrates, silicon oxides, silicon oxide hydrates, mixtures thereof, mixtures thereof with aluminum chlorides and mixtures thereof with iron chlorides.

THE PRIOR ART

It is already well known in the art, that fluorination of aliphatic chlorohydrocarbons can be effected by halogen exchange by means of fluoro-silicates in an autoclave under high pressure as well as in the gas phase under atmospheric pressure. For example, the halogen exchange proceeds between carbon tetrachloride and sodium fluoro-silicate at a pressure of about 50 to 60 atmospheres and at a temperature of 250° to 300° C. in the presence of metallic iron as catalyst within about 3 hours. The same reaction in the gas phase, if carried out in the previously known manner, requires an increase in temperature to 350° to 400° C., the employment of considerable quantities of catalysts (up to 20% of heavy metal chlorides, that is chlorides of iron, chromium, tungsten, molybdenum, bismuth, antimony and mercury) and a reaction duration of several hours to arrive at satisfactory reactions.

In the process carried out in the autoclave, the employment of a relatively high pressure in connection with corrosion involves considerable difficulties with respect to apparatus. The pressure-free process also presents considerable disadvantages. The slow reaction requires large, heated reaction apparatus and prolonged durations for the starting substances and products in the heated reaction zone, which in turn causes an increase in thermal decomposition of the reactants. This results in that the yield of valuable products may, under certain circumstances, be decreased to a great extent. In addition, the catalysts employed have to be reactivated after the solid bed has been reacted, as their loss would render the process unjustifiably expensive. This reactivation requires additional apparatus installations. Finally, due to their long reaction duration, both processes are less suitable for a continuous process of preparation. These indicated disadvantages affect in the final analysis in the economy of these methods.

OBJECTS OF THE INVENTION

An object of the invention is the development of an economical process for the fluoridation of aliphatic chlorohydrocarbons by halogen exchange with alkali metal fluoro-silicates in a gaseous phase reaction utilizing novel catalysts. The process of the invention is readily adaptable to continuous production.

Another object of the invention is the development of a process for the fluorination of aliphatic chlorinated hydrocarbons which comprises the steps of reacting a gaseous phase of an aliphatic chlorinated hydrocarbon having from 1 to 6 carbon atoms under atmospheric pressure with an alkali metal fluoro-silicate at a temperature between about 250° C. and 400° C. in the presence of from about 1% to 5% by weight, based on said sodium fluoro-silicate, of a catalyst selected from the group consisting of iron oxides, iron oxide hydrates, aluminum oxides, aluminum oxide hydrates, silicon oxides, silicon oxide hydrates, mixtures thereof, mixtures thereof with aluminum chlorides and mixtures thereof with iron chlorides.

These and other objects of the invention will become more apparent as the description thereof proceeds.

DESCRIPTION OF THE INVENTION

Now it has been discovered that certain metallic oxides and metallic hydroxides in finely distributed condition, particularly those of iron, aluminum and silicon, alone or in a mixture with other oxides or in a mixture with chlorides of the iron and of aluminum, are catalysts considerably accelerating the reaction of halogen exchange in the fluorination of aliphatic halogen hydrocarbons on passing their vapors over an alkali metal fluoro-silicate. Preferably, the reaction catalysts of the invention contain at least 50% of iron, aluminum or silicon oxides. The remainder can be natural constituents, iron or aluminum chlorides, etc. Such reaction catalysts may, for example, be activated alumina, diatomaceous earth, as well as topochemically prepared iron-(III)-oxide hydrates, so-called luxmasse used for the desulfurization of cooking gas, having an approximate analysis of over 50% iron oxide and about 20% alkalis; bauxite, red mud obtained as waste product in the production of alumina from bauxite by the Bayer process, as well as similar natural or synthetic substances.

When the above named substances are used as catalysts at a proportion of only about 1 to 5% by weight of the fluoro-silicate, the halogen exchange reaction, for example, between carbon tetrachloride and sodium fluoro-silicate can be effected under atmospheric pressure already at temperature between 250° and 400° C. within only 10 to 50 minutes, with the obtention of high yields. The catalysts of the invention are marked, in comparison with the heavy metallic chlorides, first of all by their pronounced catalytic activities. This gives rise, under identical reaction conditions, to shorter reaction duration periods, thus a smaller reaction apparatus is required and only a very slight thermal decomposition occurs. Furthermore, bauxite and red mud are particularly inexpensive materials which can be discarded after having passed through the reaction once. Thus, no expensive catalyst recovery processes are required.

It was most startling to discover that with the aid of the catalysts of the invention such a significant improvement of the process was possible. This improvement is specifically revealed in Example 6, showing the comparison with the operation method described and known from the literature. Although in the very numerous known fluorination processes, various measures had been employed and various catalysts had been used, there is no previous process known in the art which attains a similar economy to the process of the invention.

The reaction is applicable on any aliphatic chlorinated hydrocarbons chosen at random, such as carbon tetrachloride, hexachloroethane, tetrachloroethylene, hexachloropropene, chloroform, chlorinated butyl, pentyl, or hexyl compounds or the like. These aliphatic chlorinated hydrocarbons are preferably aliphatic chlorohydrocarbons having from 1 to 6 carbon atoms and containing at least twice as many chlorine atoms as hydrogen atoms. Preferably, completely chlorinated aliphatic hydrocarbons free of hydrogen are utilized. The alkali-metal fluoro-silicate is preferably sodium fluoro-silicate although other alkali metal fluoro-silicates can be utilized. The chlorinated hydrocarbon is ordinarily employed in excess of the theoretical amount.

The following examples will serve to illustrate the process of operation of the invention, but it should be understood, that they do not limit the selection of the fluoro-silicate or chlorohydrocarbon employed as well as of the reaction catalysts.

Example 1

120 parts by weight of granulated sodium fluoro-silicate were admixed with 6 parts by weight of powdery red mud, obtained as a waste product in the production of alumina from bauxite by the Bayer process and having an average analysis of 25–40% $H_2O$, about 50% $Fe_2O_3$, some sodium aluminum silicate, sodium metatitanate and the like. The mixture was heated to 380° to 400° C. in a reaction tube with an inside diameter of 30 mm. and vapors of carbon tetrachloride were passed therethrough. The $CCl_4$ through-put amounted to 10 parts by weight per minute. Shortly after the vapor treatment had started (½ to 1 minute), a brisk reaction commenced and the temperature dropped to 340° C. After 30 minutes, the reaction was practically completed and therefore it was discontinued. The analysis showed essentially 70 parts by weight of sodium chloride, 10.2 parts by weight of $CF_2Cl_2$ and 141.5 parts by weight of $CFCl_3$. 7 parts by weight of sodium fluoro-silicate remained unchanged. This corresponded with a reaction of 94% of the sodium fluoro-silicate. 104 parts by weight of unreacted carbon tetrachloride were recovered.

Example 2

20 parts by weight of granulated sodium fluorosilicate were admixed with 0.7 part by weight of iron-(III) oxide hydrate, which had been topochemically prepared from crystalline iron-(III) sulfate. This mixture was vapor treated with carbon tetrachloride in a reaction tube, after a reaction temperature of 340° to 360° C. had been attained. After a reaction duration of 22 minutes, the exchange of fluorine amounted to 94%.

Example 3

A reaction layer consisting of 20 parts by weight of granulated sodium fluoro-silicate and 1 part by weight of finely ground bauxite was treated for 22 minutes with gaseous carbon tetrachloride. Reaction temperature=360° to 380° C.; Fluorine exchange=81%.

Example 4

A mixture of 100 parts by weight of sodium fluoro-silicate with 3 parts by weight of activated alumina and 2 parts by weight of anhydrous iron-(III)chloride was treated with vapors of carbon tetrachloride in a reaction tube at a temperature of 380° C. for 30 minutes. The through-put of carbon tetrachloride was 10 parts by weight per minute. After 30 minutes, 88% of the sodium fluoro-silicate had been reacted.

Example 5

190 parts by weight of sodium fluoro-silicate were admixed with 9.5 parts by weight of red mud and treated with vapors of hexachloropropene at 400° C. The through-put of hexachloropropene was about 10 parts by weight per minute. After a reaction duration of 50 minutes, the sodium fluoro-silicate was converted to sodium chloride. The products obtained were determined by analytical distillation (each in parts by weight), as follows:

| | |
|---|---|
| $C_3FCl_5$ | 50.5 |
| $C_3F_2Cl_4$ | 174.0 |
| $CFCl_3$ | 27.5 |
| $CCl_4$ | 18.5 |
| $C_2Cl_4$ | 23.2 |
| $C_2Cl_6$ | 47.4 |

Example 6

100 parts by weight of sodium fluoro-silicate were admixed with 10 parts by weight of anhydrous chromium-(III) chloride and treated with 10 parts by weight of vapors of carbon tetrachloride per minute in a reaction tube at 360° C.

After 30 minutes, 35% of the sodium fluoro-silicate had been reacted.

The preceding specific embodiments are illustrative of the practice of the invention. It is to be understood, however, that other expedients known to those skilled in the art or discussed above can be employed without departing from the spirit of the invention or the scope of the appended claims.

I claim:

1. A process for the fluorination of aliphatic chlorinated hydrocarbons which consists essentially of the steps of reacting a gaseous phase of an aliphatic chlorinated hydrocarbon having from 1 to 6 carbon atoms under atmospheric pressure with an alkali metal fluoro-silicate at a temperature between about 250° C. and 400° C. in the presence of about 1% to 5% by weight, based on said alkali metal fluoro-silicate, of a catalyst selected from the group consisting of iron oxides, iron oxide hydrates, aluminum oxides, aluminum oxide hydrates, silicon oxides, silicon oxide hydrates, mixtures thereof, mixtures thereof with less than 50% of aluminum chlorides and mixtures thereof with less than 50% of iron chlorides.

2. The process of claim 1 wherein said alkali metal fluoro-silicate is sodium fluoro-silicate.

3. The process of claim 1 wherein said aliphatic chlorinated hydrocarbon is free of hydrogen.

4. The process of claim 1 wherein said catalyst consists of over 50% of an oxide selected from the group consisting of activated silica and activated alumina and the remainder iron-(III) chloride.

5. The process of claim 1 wherein said catalyst is a technical product containing at least 50% of said oxides and oxide hydrates selected from the group consisting of bauxite, red mud and luxmasse.

6. The process of claim 1 wherein said aliphatic chlorinated hydrocarbon having from 1 to 6 carbon atoms is a chlorinated alkane having at least twice as many chlorine atoms as hydrogen atoms.

7. The process of claim 1 wherein said aliphatic chlorinated hydrocarbon having from 1 to 6 carbon atoms is a chlorinated alkene having at least twice as many chlorine atoms as hydrogen atoms.

References Cited

UNITED STATES PATENTS 3,131,226   4/1964   Olstowski et al. ____ 260—653.8

DANIEL D. HORWITZ, Primary Examiner

U.S. Cl. X.R.

260—653.8; 252—441